United States Patent
Ludsteck et al.

(10) Patent No.: US 12,343,786 B2
(45) Date of Patent: Jul. 1, 2025

(54) METHOD AND DEVICE FOR MONITORING AND/OR CONTROL OF A FLOW-HOLE AND THREAD-FORMING PROCESS

(71) Applicant: Atlas Copco IAS GmbH, Bretten-Gölshausen (DE)

(72) Inventors: Michael Ludsteck, Munich (DE); Manuel Guglhör, Benediktbeuren (DE)

(73) Assignee: Atlas Copco IAS GmbH, Bretten-Goelshausen (DE)

( * ) Notice: Subject to any disclaimer, the term of this patent is extended or adjusted under 35 U.S.C. 154(b) by 288 days.

(21) Appl. No.: 17/836,847

(22) Filed: Jun. 9, 2022

(65) Prior Publication Data
US 2022/0395893 A1 Dec. 15, 2022

(30) Foreign Application Priority Data
Jun. 11, 2021 (DE) .......................... 102021115210.0

(51) Int. Cl.
*B21J 5/06* (2006.01)
*G05B 19/18* (2006.01)

(52) U.S. Cl.
CPC ............ *B21J 5/066* (2013.01); *G05B 19/182* (2013.01); *Y10T 29/53383* (2015.01)

(58) Field of Classification Search
CPC .................. B21J 5/066; G05B 19/182; G05B 2219/41109; G05B 2219/45203; G05B 2219/45219; G05B 2219/49333; G05B 19/186; G05B 19/19; Y10T 29/53383; B23P 19/066; B23P 19/06
See application file for complete search history.

(56) References Cited

U.S. PATENT DOCUMENTS

| | | | |
|---|---|---|---|
| 2008/0021652 A1* | 1/2008 | Schneider | G06Q 30/0201 702/3 |
| 2014/0360322 A1 | 12/2014 | Oberle | |
| 2015/0328677 A1 | 11/2015 | Pfeiffer | |
| 2018/0126444 A1* | 5/2018 | Pfeiffer | B21K 25/005 |
| 2018/0200780 A1 | 7/2018 | Stutzer | |
| 2019/0267650 A1* | 8/2019 | Egawa | H01M 8/04768 |
| 2021/0046559 A1 | 2/2021 | Guglhor | |

FOREIGN PATENT DOCUMENTS

| | | |
|---|---|---|
| CN | 107530880 A | 1/2018 |
| DE | 102007024627 B3 | 1/2009 |
| EP | 3093107 A1 | 11/2016 |
| GB | 2436027 A | 9/2007 |
| JP | H 02180532 A | 7/1990 |
| JP | H 07276160 A | 10/1995 |
| JP | 2006123123 A | 5/2006 |

OTHER PUBLICATIONS

Office Action issued Dec. 8, 2023, in Chinese patent application 202210659332.5.
Extended European Search Report issued Nov. 3, 2022 in EP 22 17 7181.9.

* cited by examiner

*Primary Examiner* — Charles Cai
(74) *Attorney, Agent, or Firm* — Calvert Technology Law, PLLC; Nathan H. Calvert

(57) ABSTRACT

A method and a device are provided for simplifying a flow-hole screw process, in which the difference between a process parameter and its smoothed value is employed as a criterion for changing said process parameter or another process parameter in order in particular to be able to determine the changeover point between hole forming and thread forming.

16 Claims, 4 Drawing Sheets

METHOD AND DEVICE FOR MONITORING AND/OR CONTROL OF A FLOW-HOLE AND THREAD-FORMING PROCESS

TECHNICAL FIELD OF THE INVENTION

The present invention relates to a method and a device for a joining process, in particular a flow-hole and thread-forming process, which below can also be simply called a "screw process" or "joining process."

BACKGROUND OF THE INVENTION

In a joining process, a fastener is introduced into a workpiece in a plurality of immediately successive process steps, wherein "workpiece" is, as a rule, understood to be two adjacent elements that are to be joined together. The fastener can in particular be a flow-hole screw. Comparable elements are also called "flowpush elements" or "flow-hole-forming press-fit bolts." The following statements therefore refer in simplified terminology to the specific embodiments of the fastener as "flow-hole screw" or simply just "screw" as representative of the general term "fastener."

In the substantially known joining process using a flow-hole screw, the screw is first set by its tip on the workpiece (positioning). Then the rotation speed is increased and the screw is pressed against the workpiece with a high axial force, wherein the workpiece material heats and begins to flow. Under high axial force and with rapidly decreasing rotation speed, the screw is then pressed into the workpiece up to the beginning of the thread-forming segment (hole forming). The screw is then screwed into the workpiece with a clearly reduced rotation speed and in doing so forms a thread in the workpiece (thread forming). Finally, the screw is screwed into the workpiece up to the head and tightened (final tightening).

The transition from one process step to the next should be accurately monitored and take place precisely. For example, the transition from hole forming to thread forming must be accurately detected. This is the case in particular because the rotation speed (and also other parameters such as the axial force and/or the feed) must be altered so as on the one hand not to begin thread forming until the penetration depth is sufficient and on the other hand not to penetrate too deeply at too high a rotation speed, so as not to threaten the proper formation of the thread in correspondence with its pitch. However, the transition needn't be associated with a specific point in time in the sense of a suddenly occurring event. Instead, hole forming can also transition into thread forming in a steady process controlled by a regulating or controlling process. This also applies to the transition between other process steps in the flow-hole screw process. In the prior art a changeover point is determined, for example by detecting the penetration depth. This is based on the assumption the hole forming will always be complete when, for example, the distance of the screw head to the workpiece surface has exceeded a set distance. However, in this case the workpiece thickness tolerances are left out of consideration. If the screw penetrates through the workpiece too early, the thread-forming part of the screw will engage the workpiece with a rotation speed and process force that is too high and possibly damage the thread because of this.

Alternatively, employing the gradients of the penetration depth as a changeover criterion is known from DE 10 2007 024 627 B3. For example, the penetration depth per unit of time is monitored. When the material of the workpiece begins to flow, the screw penetrates into the workpiece. For the "penetration depth per unit time" gradients, which are rising in this case, one can use the crossing of a preset threshold value as the changeover criterion.

SUMMARY OF THE INVENTION

An object of the present invention is to offer alternative solutions for control and regulation of the joining process based on observation of process data.

According to a first aspect of the invention, methods are provided for controlling a flow-hole and thread-forming process in which a fastener is driven through a workpiece with a speed (N), a torque (M), and a feed force (F) over a penetration depth (Z). These methods include measuring a process parameter (R(t)) of the flow-hole and thread-forming process. A smoothed curve (R*(t)) of the process parameter (R(t)) is determined as is a difference (D(t)) of the process parameter (R(t)) and its smoothed curve (R*(t)), D(t)=R(t)−R*(t). Methods according to this first aspect further include changing a process parameter of the flow-hole and thread-forming process based on the difference (D(t)).

A second aspect of the invention encompasses joining devices. Joining devices according to this second aspect include a control unit configured to control one or more components for performing a flow-hole and thread-forming process in which a flow-hole screw is driven through a workpiece with a speed (N), a torque (M), and a feed force (F) over a path (Z) (penetration depth). The control unit is configured for issuing and receiving signals concerning the rotation speed (M), the torque (N), and the penetration depth (Z) of the flow-hole screw into the workpiece. The control unit measures a process parameter (R(t)) of the flow-hole and thread-forming process, and determines a smoothed curve (R*(t)) of the process parameter (R(t)). The control unit also determines a difference (D(t)) of the process parameter (R(t)) and its smoothed curve (R*(t)), D(t)=R(t)−R*(t). Based on the difference (D(t)), the control unit alters at least one of: the rotation speed (N), the feed force (F), and the torque (M).

These and other aspects, advantages, and features of the invention will be apparent from the following description of representative embodiments, considered along with the accompanying drawings.

DESCRIPTION OF REPRESENTATIVE EMBODIMENTS

Figure 1:
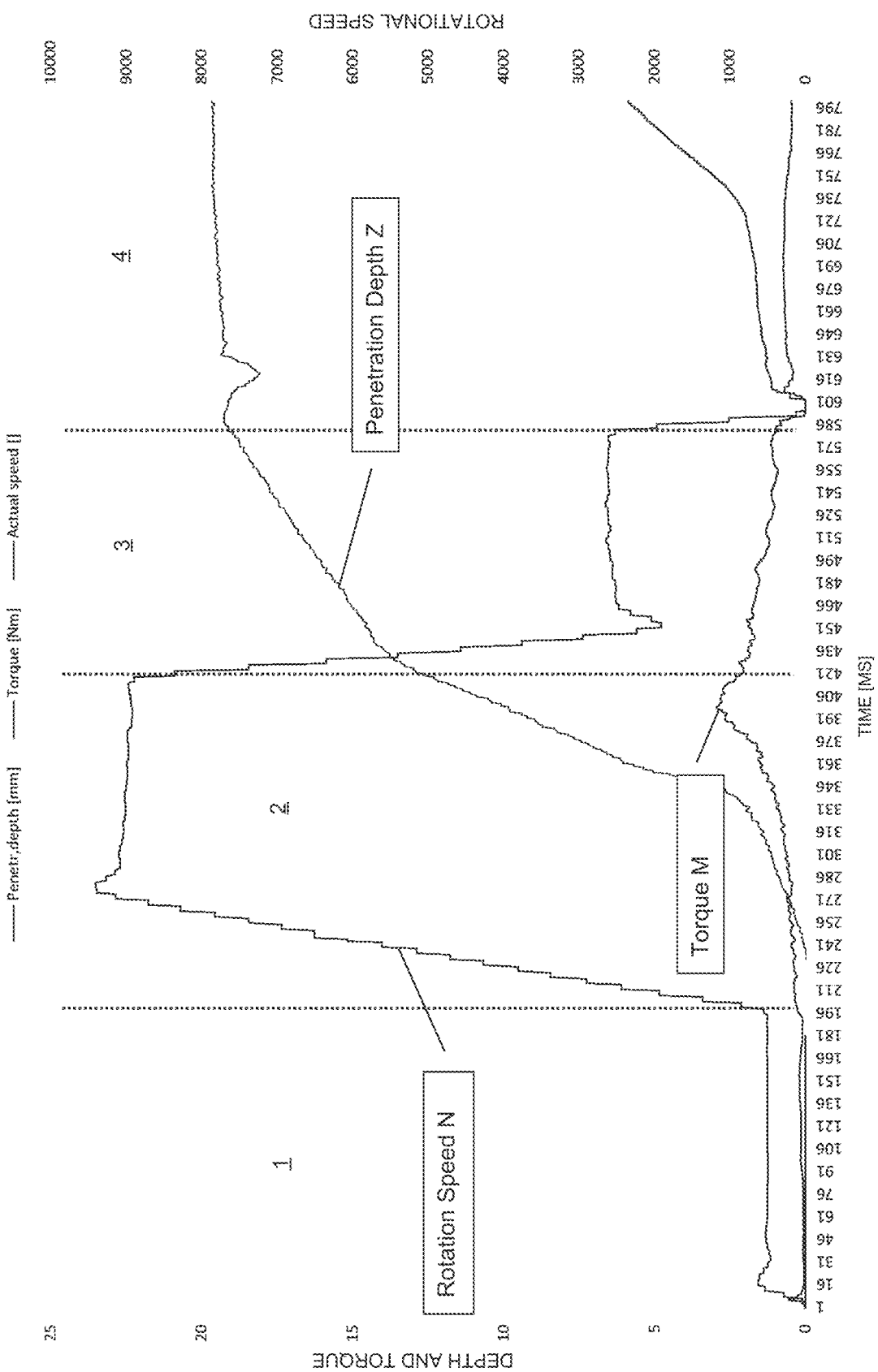
FIG. 1 shows a graph illustrating typical phases of a flow-hole screw process.

According to some embodiments of the invention, a method is provided for regulating or controlling the joining process or the initiation of the individual process steps on the basis of a process parameter R that occurs in the process and its smoothed value R*. The smoothed R* values derived from the values of the process parameter R allow a prediction the expected remaining values of the process parameter. Each value R(t) of the process parameter R can thus be associated with an expected smoothed value R*(t). Depending on the selected smoothing method and the factors employed in it, the values R(t) and R*(t) lie more or less close to each other. The true process parameter R runs ahead of the smoothed parameter R*, while the curve of the smoothed value R* representing the prediction becomes permanently corrected on the basis of the next true detected value of the process parameter R. The distance between the two values is described by the difference D(t)=R(t)−R*(t).

An abrupt change of the process parameter value R at time t thus leads to the true value R(t) deviating more significantly from the smoothed value R*(t) predicted for said time than would be expected for a process parameter R that is changing only gradually, so that the deviation or the difference D(t) becomes large. According to the invention, this difference D(t) is to be monitored and used as the changeover criterion, for example from the comparison with a preset threshold value. Unlike the prior art, in accordance with the invention it is not the gradient of a process parameter that is monitored in order to derive a changeover criterion from it. Instead, the comparison between a process parameter and its smoothed value is then used to modify the process, by changing, for example, a process parameter.

In some alternative embodiments, instead of the difference between the process parameter and its smoothed value, only the course of the smoothed curve and, for example, is employed to evaluate its gradient as changeover criterion. Through a suitably selected smoothing process, the smoothing curve can be approximated as closely as possible to the true course of the parameter without reflecting its individual variations or outliers. A gradient of the smoothed curve lying above a threshold value could likewise be interpreted as a changeover criterion.

The calculation of the smoothed value R* can take place according to various conditions. In particular, this smoothed value can be an exponential smoothing that can be calculated by a first or higher order. Empirically determined values or individual factors or coefficients characterizing specific processes can enter into the smoothing calculation. Here, it is incumbent on the specialist to incorporate smoothing processes and correction values that are suitable for the relevant process parameter.

In general, the difference D(t) may be produced for different process parameters and their smoothed values in various embodiments. The evaluation of the difference can be used to change one or more process parameters. The altered process parameter can be the very same process parameter R that is included in the difference. However, some embodiments may change other process parameters (M, N, F, . . . ) in dependence on the difference formed for a specific process parameter R. The process parameter R can in this case also be formed as a combination of a plurality of process parameters, for example as their sum or product.

The evaluation of the difference or a resulting effect on a process parameter can be limited to timewise limited segments of the flow-hole screw process. For example, some embodiments do not undertake an evaluation of the difference D affecting the rotation speed as a process parameter during the desired buildup of the rotation speed at the beginning of the screwing process (for example, for about 100 ms), so as to ensure that the minimum rotation speed is reached. After a minimum rotation speed has been reached and/or after a, for example empirically determined, minimum time has passed, the monitoring of the difference can begin. Alternatively, the curve of the torque M(t) (then serving as process parameter R) could, for example, be compared with its smoothed curve M*(t) only after the screw has penetrated into the workpiece, so as to mask variations in the course of the torque and to stop the final tightening only after a preset smoothed torque value M* has been reached.

Expediently, one embodiment of the method according to the invention calls for the detected and smoothed process parameter to be formed with the rotation speed N and/or the torque M and/or the feed force F and/or the penetration depth Z, preferably accordingly to the condition in Equation (1):

$$R \sim (M \cdot N)/(Z+\beta), \text{ where} \quad (1)$$

M is the torque introduced into the screw (for example detected by a torque sensor or via motor data)

N is the rotation speed of the screw (for example, detected by a resolver on the motor or a sensor)

Z is the penetration depth of the screw into the component (measured by path measurement systems or sensors), and $\beta$ is a preset summand, which could be, for example, a length, for example described in millimeters, and which could also be set to zero.

The product of torque M and rotation speed N corresponds to the power P.

For example, for one of the said process parameters R, the exponential first order smoothing, which is known to one skilled in the art, according to the known general formula shown in Equation (2):

$$R^*_{(t)} = a \cdot R_{(t)} + (1-a) \cdot R^*_{(t-1)} \quad (2)$$

which can be used with a smoothing factor a between 0 and 1; for example a smoothing factor of a=0.1 could be selected.

Expediently, the method according to some embodiments of the invention is designed so that the rotation speed N and/or the feed force F become automatically modified if the difference D(t) exceeds a preset threshold value S. For example, it can be provided that a process parameter R affecting the power and penetration depth and its smoothed value R* is employed to form the difference D(t)=R(t)−R*(t). Since the power per penetration depth decreases at the time at which the material of the workpiece begins to flow or the fastener tip has penetrated the workpiece (and thus the process segment of hole forming must be ended), the difference D(t) will become large at this moment or larger than a preset threshold value S. If this is detected and the rotation speed N is thereupon reduced, the process can transition to the process step of thread forming and the screw can be screwed into the workpiece with reduced rotation speed and reduced force with increasing penetration depth.

(The term "greater than" or "less than" can refer to the amount of the difference or its absolute value, just as this is valid for the threshold value S. If the amount of the difference D is compared with the amount of a threshold value S, positive, like negative, deviations of the process parameter R from its smoothed value R* that are greater than the amount of the threshold value are interpreted as changeover criterion. However, an especially favorable embodiment of the method provides that only a deviation in one of the two directions (positive or negative) satisfies the changeover criterion. For example, if a decrease is to be detected in which the rotation speed N being monitored as process parameter R falls below its smoothed value R* by a specific amount and thus the difference (R(t)−R*(t)) is correspondingly negative, then the threshold value S employed for comparison in each case preferably also should be selected as negative according to the computational operation of the comparison.)

The method according to some embodiments of the invention is characterized in that the optimum changeover point can advantageously be determined independent of the screw geometry (diameter, length, thread pitch), the material or variations in the material quality, the thickness and combination of the connection (elements to be joined), the feed force F, and the position, orientation, and mounting of the driver that acts on the screw to screw it in.

It is provided according to another embodiment of the method that the threshold value S is formed while taking into account a previously achieved maximum value $R^*_{max}$ of the smoothed parameter R* curve and a preset process value a, preferably according to the condition in Equation (3):

$$S = R^*_{max}/\alpha \tag{3}$$

($\alpha$ can, for example, be a real number that is specified as a constant for the process or is derived from other constant or variable process values).

In this way, the threshold value S is established in dependence on or in proportion to a maximum value $R^*_{max}$ of the smoothed value that arises for the first time in the process and was previously unknown. Larger absolute values of the maximum value of $R^*_{max}$ then also lead to a correspondingly more generously measured threshold value S, so that the difference D(t) employed for the changeover is compared with a dynamically determined threshold value. This creates a dynamic adjustment to the operating conditions arising in the process and the changeover criterion or the threshold value S need not be inflexibly established beforehand. This is advantageous, since the required energy up to the time of through-penetration of the screw can vary significantly according to the material pairing. An example of the threshold value (S) is 5.5 N/s.

Advantageously, the method according to some embodiments of the invention includes the following process steps:

a) applying a rotation speed N and a feed force F and a resulting torque M to a flow-hole screw in order to drive the screw into or through a workpiece, b) measuring a process parameter R(t), which relates the power P applied to the flow-hole screw to the penetration depth Z by which the screw penetrates into the workpiece, wherein the power P is represented by the product of the rotation speed N and the torque M, so that the process parameter R(t) satisfies the condition in Equation (4):

$$R(t) \sim P(t)/Z, \text{ where } P(t) = N(t) \cdot M(t) \tag{4}$$

c) determination of the smoothed course R*(t) of the process parameter R d) comparing the difference D(t) of the process parameter R(t) and its smoothed course R*(t) with a threshold value S in order to determine in this way the time at which a frontmost segment of the screw penetrates into the workpiece or penetrates through it.

A joining device according to some embodiments of the invention is designed to conduct the previously described method, in particular as a flow-hole screw device. Expediently, the device comprises a control unit, where the control unit is designed a) to issue and receive signals concerning the rotation speed N, the torque M, and the penetration depth Z of the screw into the workpiece, and/or b) to determine and/or store time-dependent and/or constant process parameters R, N, M, F, correction values $\alpha$, $\beta$, and threshold values S, and/or c) to determine and store at least one smoothed process parameter R*, $R^*_{max}$, and/or d) to evaluate at least one of the said values in order to control the rotation speed N and/or the feed force F and/or the torque M in dependence on a smoothed process parameter R*.

Figure 2:
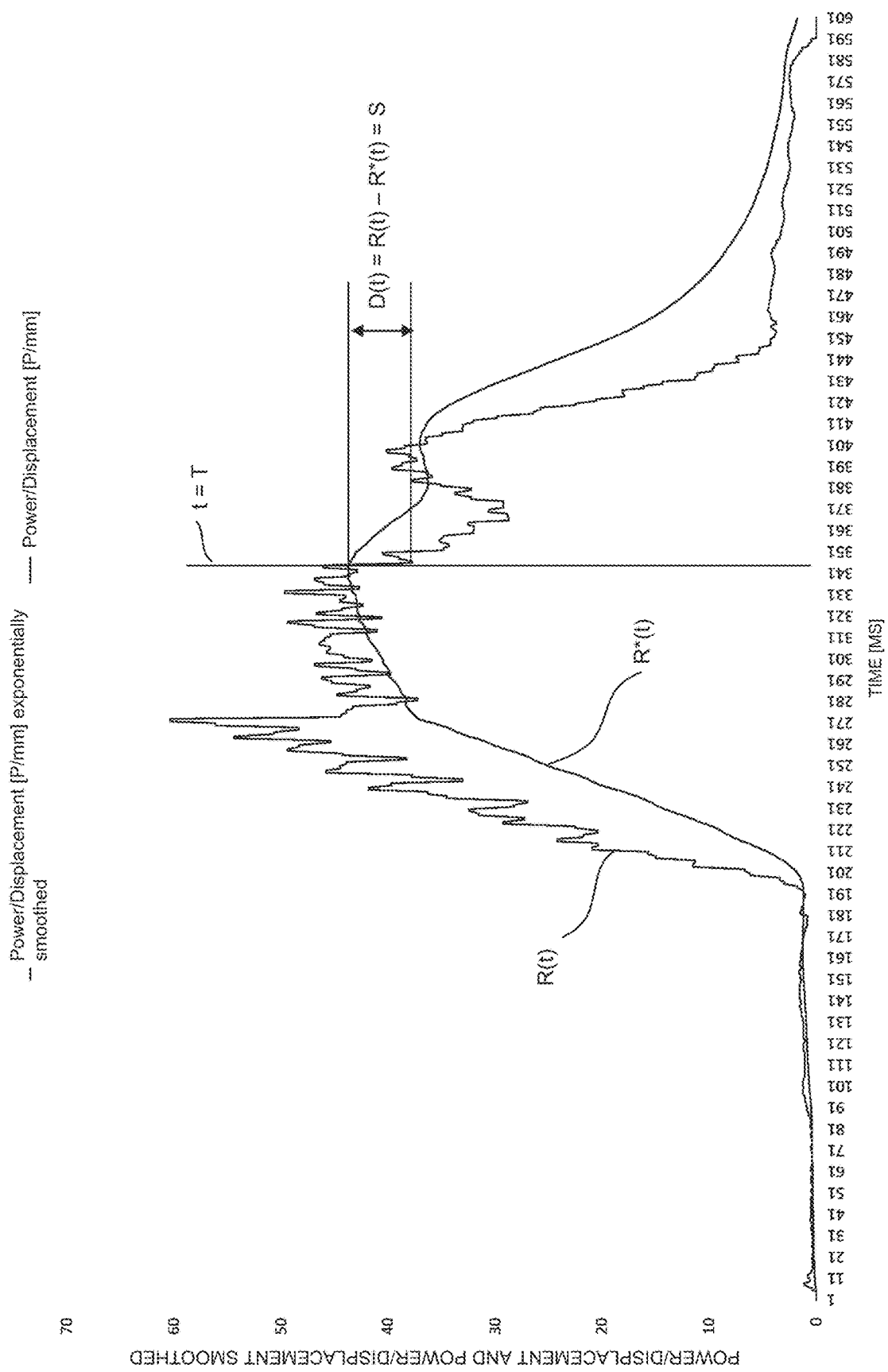
FIG. 2 shows a graph of the process parameter considered in one embodiment of the invention.

An example embodiment of the method according to the invention is explained in more detail below by means of graphs shown in FIGS. 1-3:

FIG. 1 shows the individual process phases of a flow-hole screw process in a simplified schematic representation. In process step 1, the screw is set on the workpiece (positioning). In step 2, the rotation speed of the screw and the feed force on the screw are increased. The component becomes heated by this and the metal of the workpiece in the end begins to flow around the tip of the screw (hole forming). In step 3, the screw can penetrate into the flowing material of the workpiece with a greatly reduced rotation speed and feed force. The penetration depth at this point increases essentially linearly, and the screw forms a thread in a workpiece (thread forming). In the 4th step, the screw head reaches the work piece surface (head seating) and the penetration depth no longer changes significantly. The screw is tightened to the end torque (final tightening). The overall process in this embodiment example lasts about 800 ms. FIG. 2 shows the curve of a process parameter R(t), which can be described by the formula in Equation 5:

$$R = (M \cdot N)/(Z + \beta) \tag{5},$$

and which measures the power formed from the torque M and the rotation speed N, with respect to the penetration depth Z (supplemented by a summand $\beta$). During the process, the process parameter R(t) is subject to more or less severe variations, due among other things to measurement imprecision or the material behavior of the screw and/or the workpiece. The exponentially smoothed curve of the process parameter R(t) is represented by the curve R*(t). It can be seen that the smoothed value R*(t) trails the process parameter R(t). A difference D(t)=R(t)−R*(t) can be formed at each time t. Approximately, up to time T=350 ms, this difference is either greater than zero or its amount is less than the amount of a threshold value S. At time t=T, the material of the workpiece has softened so much that the screw begins to penetrate into the workpiece with decreasing torque M and increasing penetration depth Z. The power with respect to the penetration depth, thus the process parameter R, therefore clearly decreases at this time T, indeed so far below the value R*(T) predicted by the smoothed curve that the difference D(T) "exceeds" a threshold value S (in the specific case the value of the difference is negative and smaller than the likewise negative threshold value S). This phenomenon is employed according to the invention as a changeover criterion in order to reduce the rotation speed and make a controlled transition to the thread-forming process step. Of course, other process parameters can be "monitored" in the same way and employed for a targeted change of this or another process parameter.

Figure 3:
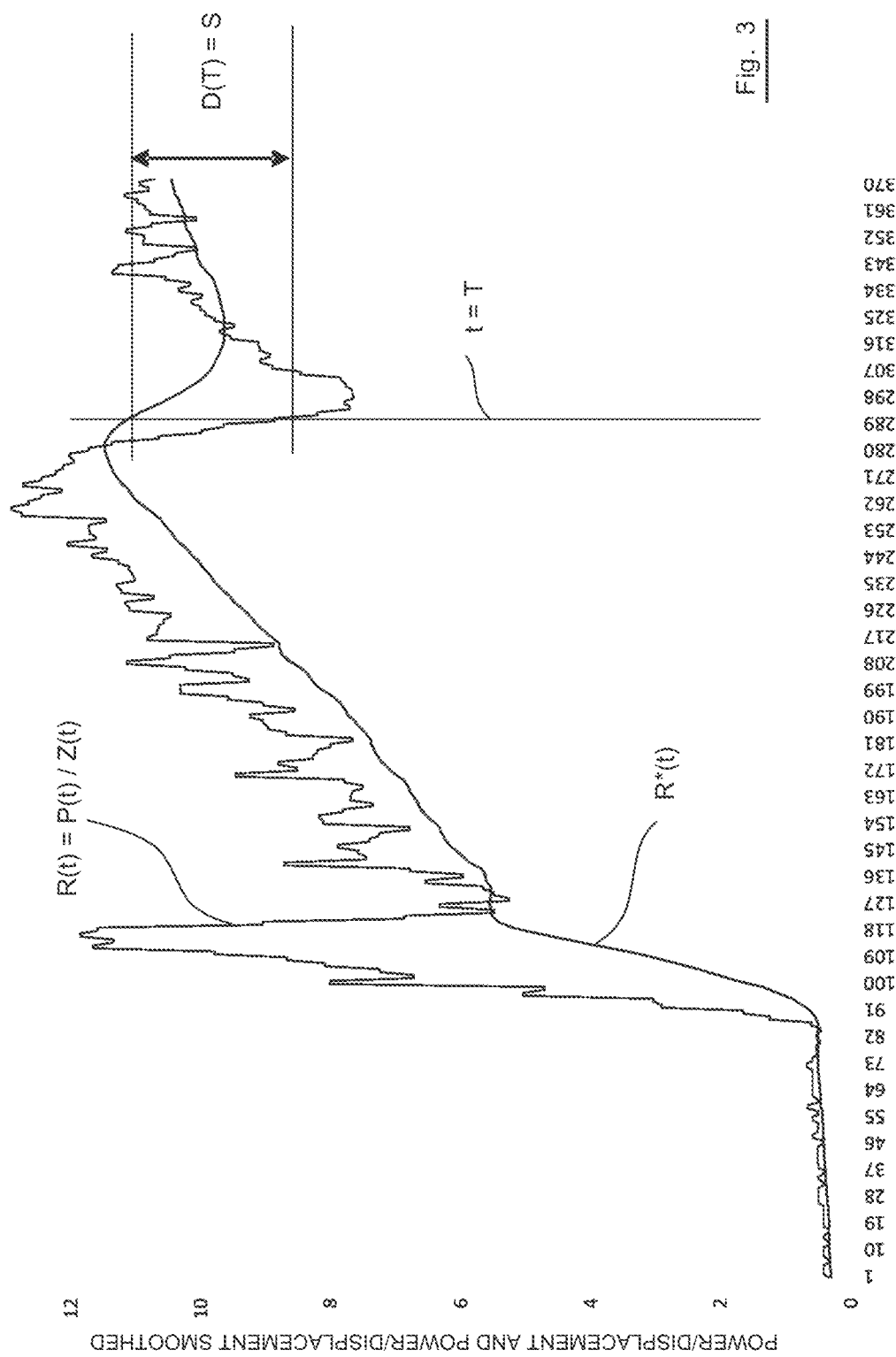
FIGS. 3 and 4 show graphs illustrating two possible curves of the process parameter.
Figure 4:
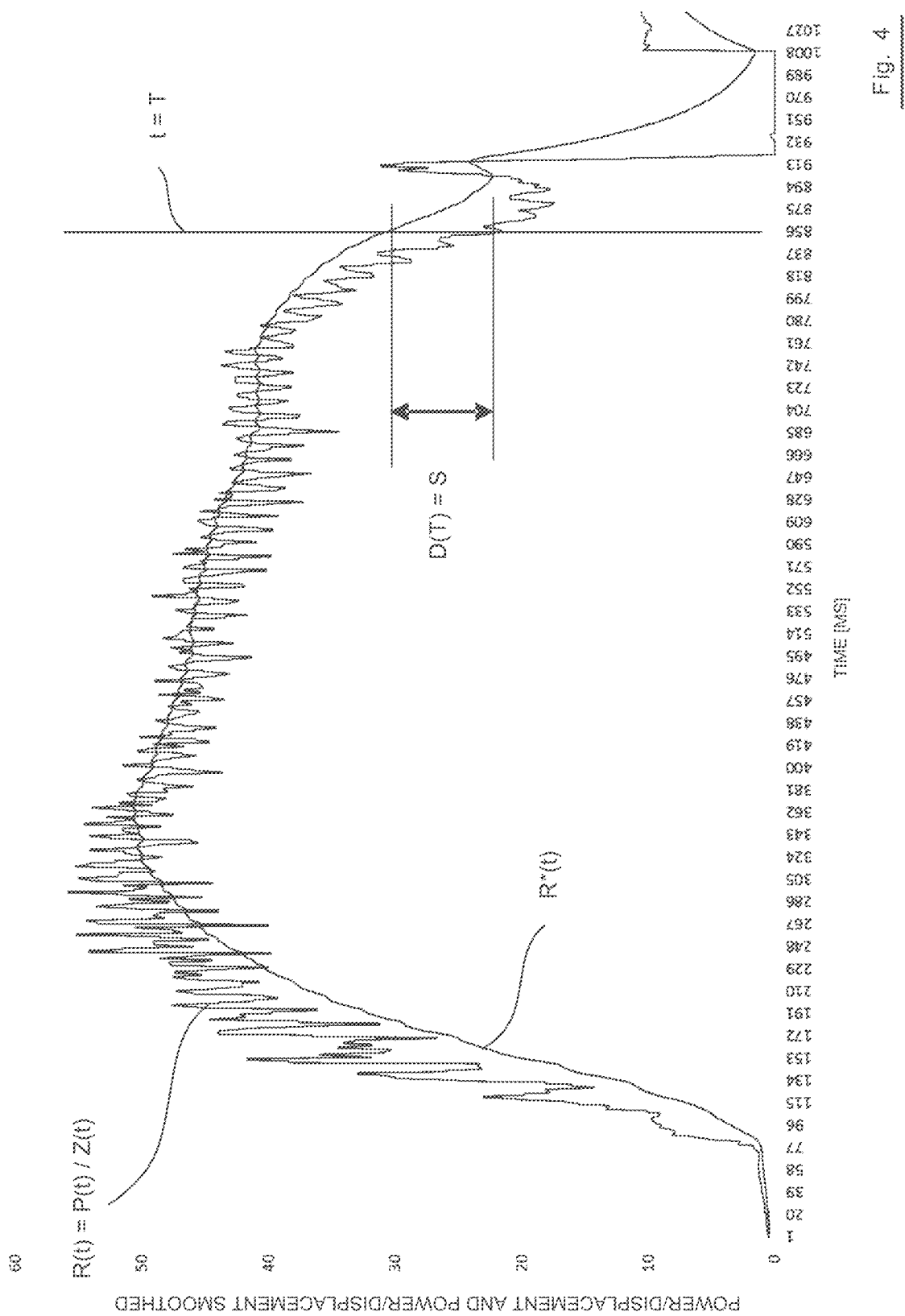

FIGS. 3 and 4 illustrate two examples of an embodiment of the method according to the invention. FIG. 3 shows the curve of the process parameter R(t) with comparably low absolute values. The negative difference between R(t) and R*(t) that crosses a (negative) threshold value (S) at time t=T is employed as changeover criterion. This time point is achieved relatively quickly and can be detected by the distinct dropoff of R compared to R*. FIG. 4 shows the case of a screw that is only slowly penetrating into the material, where at time t=T the process parameter/R(t) initially lies so far under its smoothed value R*(t) that a threshold value defining this circumstance is crossed and the changeover operation is initiated. In both cases the changeover point T can be determined reliably and precisely through a comparison with the smoothed curve R*(t) by presetting a suitable threshold value S—in spite of the different values and curves of the process parameter R(t).

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A method for controlling a flow-hole and thread-forming process in which a fastener is driven through a workpiece with a rotation speed (N), a torque (M), and a feed force (F) over a penetration depth (Z), the method comprising:
   a) measuring a process parameter (R(t)) of the flow-hole and thread-forming process;
   b) determining a smoothed curve (R*(t)) of the process parameter (R(t));
   c) determining a difference (D(t)) of the process parameter (R(t)) and its smoothed curve (R*(t)), D(t)=R(t)−R*(t); and
   d) changing a process parameter of the flow-hole and thread-forming process based on the difference (D(t)), wherein the process parameter (R(t)) is formed based on at least one of: the rotation speed (N), the torque (M), the feed force (F), and the penetration depth (Z).

2. The method of claim 1 wherein the smoothing used to determine the smoothed curve (R*(t)) is an exponential smoothing of first or higher order.

3. The method of claim 1 wherein changing the process parameter is initiated when the difference (D(t)) falls below or exceeds a preset threshold value(S).

4. The method of claim 3 wherein the threshold value(S) is formed based on a previously achieved maximum value ($R^*_{max}$) of the smoothed parameter curve (R*(t) and a preset process value ($\alpha$) according to the condition:

$$S = R^*_{max}/\alpha.$$

5. The method of claim 1 wherein the process parameter R(t) is formed according to the condition:

$$R(t) = (M \cdot N)/(Z+\beta),$$

with ($\beta$) being a preset summand.

6. The method of claim 1 further comprising initiating a change to at least one of the rotation speed (N) and the feed force (F) based on the difference (D(t)) achieving a threshold value (S) such that D(t)≥(S).

7. The method of claim 1 further comprising:
   a) applying a rotation speed (N) and a feed force (F) at a torque (M) to the fastener, in order to drive the fastener through a workpiece;
   b) wherein the process parameter (R(t)) relates a power (P) driving the fastener to the penetration depth (Z) by which the fastener penetrates into the workpiece, where the power (P) is represented by the product of the rotation speed (N) and the torque (M), so that the process parameter (R(t)) satisfies the condition R(t) is proportional to P(t)/Z, where P(t)=N(t)·M(t);
   c) wherein the comparison of the difference (D(t)) of the process parameter (R(t)) and its smoothed curve (R*(t)) with the threshold value(S) is performed in order to determine in this way the time at which a frontmost segment of the fastener penetrates the workpiece;
   d) reducing the rotation speed (N) responsive to the difference (D(t)) falling below or exceeding the threshold value(S); and
   e) screwing the fastener into the workpiece while forming a thread in the workpiece.

8. The method of claim 7 wherein the fastener is a flow-hole screw.

9. A joining device comprising:
   a controller configured to control one or more components for performing a flow-hole and thread-forming process in which a fastener comprising a flow-hole screw is driven through a workpiece with a speed (N), a torque (M), and a feed force (F) over a penetration depth (Z), the controller configured for:
      issuing and receiving signals concerning the rotation speed (N), the torque (M), and the penetration depth (Z) of the flow-hole screw into the workpiece;
      measuring a process parameter (R(t)) of the flow-hole and thread-forming process;
      determining a smoothed curve (R*(t)) of the process parameter (R(t));
      determining a difference (D(t)) of the process parameter (R(t)) and its smoothed curve (R*(t)), D(t)=R(t)−R*(t); and
      based on the difference (D(t)), altering at least one of: the rotation speed (N), the feed force (F), and the torque (M), wherein the process parameter (R(t)) is formed based on at least one of: the rotation speed (N), the torque (M), the feed force (F), and the penetration depth (Z).

10. The joining device of claim 9 wherein the smoothing used to determine the smoothed curve (R*(t)) is an exponential smoothing of first or higher order.

11. The joining device of claim 9 wherein changing the process parameter is initiated when the difference (D(t)) falls below or exceeds a preset threshold value (S).

12. The joining device of claim 11 wherein the threshold value(S) is formed based on a previously achieved maximum value ($R^*_{max}$) of the smoothed parameter curve (R*(t)) and a preset process value ($\alpha$).

13. The joining device of claim 9 wherein the process parameter (R(t)) is formed according to the condition:

$$R(t)=(M \cdot N)/(Z+\beta),$$

with ($\beta$) being a preset summand.

14. The joining device of claim 9 wherein the controller is further configured for initiating a change to at least one of the rotation speed (N) and the feed force (F) based on the difference (D(t)) achieving a threshold value(S) such that D(t)≥(S).

15. The joining device of claim 9, wherein:
the controller is further configured for commanding application of a rotation speed (N) and a feed force (F) at a torque (M) to the fastener, in order to drive the fastener through a workpiece;
the process parameter (R(t)) relates a power (P) driving the fastener to the penetration depth (Z) by which the fastener penetrates into the workpiece, where the power (P) is represented by the product of the rotation speed (N) and the torque (M), so that the process parameter (R(t)) satisfies the condition
R(t) is proportional to P(t)/Z, where P(t)=N(t)·M(t);
the comparison of the difference (D(t)) of the process parameter (R(t)) and its smoothed curve (R*(t)) with the threshold value(S) is performed in order to determine in this way the time at which a frontmost segment of the fastener penetrates the workpiece;
the controller is further configured for commanding reduction of the rotation speed (N) responsive to the difference (D(t)) falling below or exceeding the threshold value(S); and
the controller is further configured for causing the fastener to be screwed into the workpiece while a thread is formed in the workpiece.

16. The joining device of claim 12 wherein the threshold value(S) is formed according to the condition: $S=R^*_{max}/\alpha$.

* * * * *